May 3, 1932.  J. T. BALDWIN  1,856,371
SMOOTH SURFACED FLOOR COVERING
Filed Oct. 29, 1926
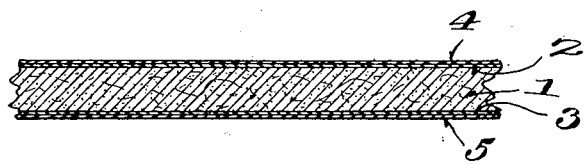
Julian T. Baldwin, Inventor
By Prentiss, Stone & Boyden.
Attorney Patented May 3, 1932

1,856,371

UNITED STATES PATENT OFFICE

JULIAN T. BALDWIN, OF WEST CHESTER, PENNSYLVANIA, ASSIGNOR TO SANDURA COMPANY, INC., OF PHILADELPHIA, PENNSYLVANIA, A CORPORATION OF NEW JERSEY

SMOOTH SURFACED FLOOR COVERING

Application filed October 29, 1926. Serial No. 145,003.

This invention relates to an improvement in smooth-surfaced floor coverings and to coatings therefor.

The present invention provides a floor covering which consists of a supporting base coated on its upper and lower sides with an outer layer of a composition which is transparent and has certain desirable properties such as flexibility, toughness, durability, smoothness, and a high resistance to the alkalies and soaps used for cleaning purposes. The supporting base may be linoleum, inlaid or printed, or waterproofed felt such as bitumen saturated felt or any bases of a similar type.

The outer layer on the upper side of the supporting base, or in other words the transparent wear coat of this invention, is applied for the purposes of adding to the wearing qualities of the floor-covering, of filling in the pores in the surface of the floor covering and thereby preventing dirt from collecting in the pores, and of improving the appearance of the floor covering by producing a surface of even lustre or dullness.

The lower side of a supporting base of the types mentioned is usually coated with a thin layer of paint, called the backing, which covers the unsightly back of the base, such as the black bitumen back of a felt base floor covering or the burlap or paper back of linoleum. The backing in some cases contains as little vehicle as possible in order that it may dry quickly and in order that the pigment will most effectively hide the back. In this latter type, the backing is less costly and dries quicker than a heavier coat containing less pigment, but the backing has a dull appearance, due to the scarcity of vehicle and the pigment tends to rub off and mar the face of the goods during the later steps in the process of manufacture.

A transparent waterproof coating of the nature to be described is applied to the backing for the purpose of changing the dull and poor appearing backing into one of richness and lustre, and of avoiding the rubbing off of the pigment.

The compositions employed as the transparent wear coat and as the transparent coat over the backing, consist broadly of resins natural or synthetic, plasticizers, and optionally modifiers.

Examples of resins employed are: acraoides gum, rosin, Manila copal, shellac, cumar, ester gum and the like. Synthetic resins such as phenol-formaldehyde resins and urea resins may also be used. It is to be understood that by resin is meant a true resin as technically distinguished from a gum. A true resin, for instance, is insoluble in water, whereas a gum is soluble in water.

Plasticizers are substances or mixtures of substances which apparently form a permanent gel or state of solution with resins. When a plasticizer is mixed with a resin, the resulting composition is generally considered to be a solution of the resin in the plasticizer, the plasticizer being the external phase. It is desirable in the present case to have the plasticizer as the internal phase or in solution in the resin. The solution is probably not a true solution but a gel, or a dispersion of plasticizer in the resin.

Plasticizers are generally liquid and have practically no vapor pressure at ordinary temperature (70° F.). They are sometimes spoken of as high boiling point solvents for resins, their boiling points ranging not much below 300° C.; they are chemically stable; free from tackiness; and impart to the resins the important properties of flexibility, toughness, impermeability, durability and smoothness of surface. Examples of plasticizers are: diethyl phthalate, dibutyl phthalate, diamyl phthalate, dibutyl tartrate, triphenyl phosphate, and tricresyl phosphate.

Modifiers are substances which impart such desirable properties as hardness, elasticity, and resistance to wear. They also serve as cheapeners and are used only optionally. Examples of modifiers are: waxes (such as Montan wax), rubber, fatty acids of vegetable oils, polymerized oils, drying oils such as tung oil, and hydrocarbons such as spinacene and squalene.

The use of volatile solvents is optional, depending upon the manner of applying coats. Examples of solvents are: ethyl alcohol, preferably denatured, benzol, toluol, naphtha, and the like.

The following is a general formula for a transparent wear coat:

| | Parts by weight |
|---|---|
| Resin | 100 |
| Plasticizer | 30 |
| Modifier | 5 |
| Solvent (if used) | 200 |

This composition may be applied without the use of a solvent by softening by means of heat, and by using in this case hot transfer rollers, or hot squeeze rollers. The liquid may be applied by means of transfer rollers, squeeze rollers, a spray, a brush or any other suitable means.

Two satisfactory formulas for transparent coatings are:

| | Parts by weight |
|---|---|
| 1. Bleached shellac | 100 |
| Dibutyl tartrate | 35 |
| 188 proof denatured ethyl alcohol | 100 |

The alcohol may be omitted and heat used to produce the necessary flow.

| | Parts by weight |
|---|---|
| 2. Cumar, light varnish grade | 50 |
| Ester gum | 50 |
| Diethyl phthalate | 25 |
| Rubber | 5 |
| Benzol | 100 |

A general formula for a transparent coating composition over the backing is as follows:—

| | Parts by weight |
|---|---|
| Resin | 100 |
| Plasticizer | 30 |
| Modifier | 5 |
| Solvent, if used | 100 |

This composition may be applied in the same way as the transparent wear coat.

A few sample formulas of the composition used over the backing are as follows:—

| | Parts by weight |
|---|---|
| 1. Acroides gum | 100 |
| Diamyl phthalate | 25 |
| 188 proof denatured ethyl alcohol | 100 |

The solvent, namely ethyl alcohol, may be omitted if heat is used. Since the coating is to be a very thin one, the use of solvent is recommended. Dyes may be added.

| | Parts by weight |
|---|---|
| 2. Cumar | 50 |
| Ester gum | 50 |
| Dibutyl phthalate | 26 |
| Toluol | 100 |
| Rubber | 5 |

The resin-plasticizer compositions described above, when used in the wear coat, besides being less subject to attack by the alkalies in soaps than are oil paints and enamels, dry in a much shorter time. Only a few minutes are required when heat is used, and a few hours when solvents are used, as compared with five to seven days for oil paints.

The compositions used in this invention also have a number of advantages over cellulose ester compositions. First of all, they are less inflammable. Then they are more easily applied with heat without the use of solvents since they soften at much lower temperatures. When solvents are used, a much higher concentration of resin may be obtained than with pyroxylin for the same viscosity. The concentration of solids in a resin solution may often be ten times as great as in a cellulose ester solution of the lowest viscosity. This results in a very large saving in the cost of solvents required to convey a given quantity of solids to the surface to which the solutions are applied.

Cheaper solvents can be used with resins than with cellulose esters. Solvent naphtha, benzol, and 188 proof denatured alcohol are the most important resin solvents. Esters, which are many times more expensive, are quite necessary for the solution of cellulose esters. Due to the greater affinity of resins for solvents, the solvents leave the resins at a slower rate than they leave cellulose ester solutions, and expensive slow evaporating solvents need not be used to such an extent with resins as with cellulose esters.

A resin-plasticizer composition will produce a higher gloss than a cellulose ester composition when applied over a highly pigmented surface such as the economical backing mentioned above, due to the lower absorption of resin by the pigments.

In the accompanying drawing, the figure, which is enlarged about five times, is a diagrammatic representation of a floor covering consisting of a supporting base 1, a decorative coat 2, a backing 3, a transparent wear coat 4, and a transparent coat 5 over the backing. The decorative coat and the backing are optional and may be applied in any manner understood by those skilled in the art.

Claims to the resin and plasticizer composition, as such, are presented in my copending application Serial 138,897, filed Oct. 1, 1926.

The resin plasticizer material described in this invention as the coating of a supporting sheet carrying the same is also described and claimed as the saturant of an impregnated sheet in my copending application Serial 159,917, filed Jan. 8, 1927.

What I claim is:—

1. A floor covering consisting of a supporting base, a coating on one side of the said base, including shellac and dibutyl tartrate; and a coating, on the other side of said base, including acroides gum and diamyl phthalate.

2. A floor covering comprising a supporting base having a display surface, an outer transparent coat on the upper side of said base and through which said display surface is visible, and a transparent coat on the lower side of said base, the transparent coat on the lower side of said base consisting of substances which are substantially similar to those of which said transparent coat on the upper side are composed, each of said transparent coatings being free from tackiness and having as its two major ingredients a resin and a substantially chemically stable plasticizer for the resin.

3. A floor covering comprising a supporting base having a display surface, and an outer transparent wear coat through which said display surface is visible, said wear coat being free from tackiness and having as its two major ingredients a resin and a substantially chemically stable plasticizer for the resin, the proportions being not less than twenty parts nor more than thirty-five parts of plasticizer to each one hundred parts of resin.

4. A floor covering comprising a supporting base having a backing surface and an upper wear surface, and an outer transparent coating covering said backing surface, said transparent coating being free from tackiness and having as its two essential ingredients a resin and a substantially chemically stable plasticizer for the resin, the proportions being not less than twenty parts nor more than thirty-five parts of plasticizer to each one hundred parts of resin.

In testimony whereof I affix my signature.

JULIAN T. BALDWIN.